United States Patent
Ino et al.

(10) Patent No.: US 10,477,432 B2
(45) Date of Patent: Nov. 12, 2019

(54) ENCODING DEVICE, ENCODING METHOD, DECODING DEVICE, DECODING METHOD, PROGRAM, AND WIRELESS COMMUNICATION SYSTEM

(71) Applicant: Sony Semiconductor Solutions Corporation, Kanagawa (JP)

(72) Inventors: Hiroyuki Ino, Tokyo (JP); Makoto Noda, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 106 days.

(21) Appl. No.: 15/531,121

(22) PCT Filed: Dec. 2, 2015

(86) PCT No.: PCT/JP2015/083896
§ 371 (c)(1),
(2) Date: May 26, 2017

(87) PCT Pub. No.: WO2016/098592
PCT Pub. Date: Jun. 23, 2016

(65) Prior Publication Data
US 2017/0367006 A1 Dec. 21, 2017

(30) Foreign Application Priority Data
Dec. 16, 2014 (JP) .................. 2014-254155

(51) Int. Cl.
*H04W 28/06* (2009.01)
*H04L 1/00* (2006.01)
*H04L 5/00* (2006.01)

(52) U.S. Cl.
CPC .......... *H04W 28/06* (2013.01); *H04L 1/0003* (2013.01); *H04L 1/007* (2013.01); *H04L 1/0072* (2013.01);
(Continued)

(58) Field of Classification Search
CPC .... H04W 28/06; H04L 5/0044; H04L 1/0003; H04L 1/0009
See application file for complete search history.

(56) References Cited

U.S. PATENT DOCUMENTS 9,178,659 B2 * 11/2015 Gaddam ............... H04L 1/0057
2010/0303096 A1 * 12/2010 Kasher .................. H04L 1/007
370/474

FOREIGN PATENT DOCUMENTS

JP 2007-243234 A 9/2007
JP 2010-074467 A 4/2010
(Continued)

*Primary Examiner* — Jamal Javaid
(74) *Attorney, Agent, or Firm* — Michael Best & Friedrich LLP

(57) ABSTRACT

The present technology relates to an encoding device, an encoding method, a decoding device, a decoding method, a program, and a wireless communication system that enable efficient transmission of frames in accordance with the condition of the transmission path.

An encoding device of one aspect of the present technology encodes and modulates transmission data stored in a payload, and encodes and modulates modulation/encoding information by predetermined schemes, the modulation/encoding information indicating at least one of the schemes of encoding and modulation for stored information stored in a header, and at least one of the schemes of encoding and modulation for the transmission data. The encoding device also encodes and modulates the stored information by schemes indicated by the modulation/encoding information, and transmits a frame formed by attaching the header to the payload, the header being formed with a first region and a second region, the first region storing the modulation/encoding information, the second region storing the stored information. The present technology can be applied to devices that perform wireless communication using a 60 GHz band, for example.

7 Claims, 13 Drawing Sheets

(52) U.S. Cl.
CPC .......... *H04L 1/0075* (2013.01); *H04L 1/0088* (2013.01); *H04L 5/0044* (2013.01); *H04L 1/0009* (2013.01)

(56) References Cited

FOREIGN PATENT DOCUMENTS

| | | |
|---|---|---|
| JP | 2012-521131 A | 9/2012 |
| JP | 2012-527824 A | 11/2012 |

\* cited by examiner

FIG. 3

| MCS NUMBER | PAYLOAD MODULATION SCHEME | PAYLOAD CODE RATE | HEADER MODULATION SCHEME | SPREAD RATE IN FIXED SPREAD REGION OF HEADER | SPREAD RATE IN VARIABLE SPREAD REGION OF HEADER |
|---|---|---|---|---|---|
| 0 | BPSK | 11/15 | BPSK | 24 | 24 |
| 1 | BPSK | 14/15 | BPSK | 24 | 16 |
| 2 | QPSK | 11/15 | BPSK | 24 | 16 |
| 3 | QPSK | 14/15 | BPSK | 24 | 8 |
| 4 | 16QAM | 11/15 | BPSK | 24 | 4 |
| 5 | 16QAM | 14/15 | BPSK | 24 | 2 |

ENCODING DEVICE, ENCODING METHOD, DECODING DEVICE, DECODING METHOD, PROGRAM, AND WIRELESS COMMUNICATION SYSTEM

TECHNICAL FIELD

The present technology relates to encoding devices, encoding methods, decoding devices, decoding methods, programs, and wireless communication systems, and more particularly, to an encoding device, an encoding method, a decoding device, a decoding method, a program, and a wireless communication system designed to be capable of efficiently transmitting frames in accordance with the condition of the transmission path.

BACKGROUND ART

Data transmission and reception in a wireless communication system are carried out with frames in some cases. One frame is normally formed with a preamble, a header (a physical layer header), and a payload.

The preamble is formed with repetitions of a known signal sequence that is used in frame detection. The header stores the information necessary for demodulating and decoding the payload. The payload stores the current user data to be transmitted.

Since the information necessary for demodulating and decoding the payload is stored in the header, a reception device cannot correctly demodulate and decode the payload in a case where there is an error in the header.

Therefore, a transmission device normally encodes and modulates the header, using a scheme with performance similar to that of the scheme with the highest demodulation/decoding performance among the modulation schemes and the encoding schemes for the payload, or using a scheme with even higher performance than that.

The transmission device selects a modulation scheme and an encoding scheme suitable for the quality of the transmission path from among the schemes, and encodes and modulates the payload, using the selected schemes. Meanwhile, the transmission device encodes and modulates the header, using a predetermined scheme.

CITATION LIST

Patent Document

Patent Document 1: Japanese Patent Application Laid-Open No. 2010-74467

SUMMARY OF THE INVENTION

Problems to be Solved by the Invention

In a case where schemes with low performance are selected as the modulation scheme and the encoding scheme for the payload because the quality of the transmission path is high, the performance of the predetermined modulation scheme and the predetermined encoding scheme for the header might become too high, resulting in a decrease in transmission efficiency. Where schemes with higher performance are used as the modulation scheme and the encoding scheme, the redundancy of the header becomes larger, and the efficiency of transmission of the entire frame becomes lower.

Patent Document 1 discloses a technique by which information about the modulation scheme, the encoding scheme and the like for the header is stored in a physical layer header optimizing field provided in the preamble. With this, schemes suitable for the quality of the transmission path can be used as the modulation scheme and the encoding scheme for the header. However, the transmission efficiency becomes lower due to the existence of the header optimizing field.

The present technology has been made in view of these circumstances, and aims to enable efficient transmission of frames in accordance with the condition of the transmission path.

Solutions to Problems

An encoding device of one aspect of the present technology includes: a payload processing unit that encodes and modulates transmission data stored in a payload; a header processing unit that encodes and modulates modulation/encoding information by predetermined schemes, and encodes and modulates stored information by schemes indicated by the modulation/encoding information, the modulation/encoding information indicating at least one of an encoding scheme and a modulation scheme for the stored information stored in a header, and at least one of an encoding scheme and a modulation scheme for the transmission data; and a transmission unit that transmits the frame formed by attaching the header to the payload, the header being formed with a first region and a second region, the first region storing the modulation/encoding information, the second region storing the stored information.

A decoding device of another aspect of the present technology includes: a reception unit that receives a frame, the frame being formed by attaching a header to a payload storing transmission data, the header being formed with a first region and a second region, the first region storing modulation/encoding information, the second region storing stored information, the modulation/encoding information indicating at least one of an encoding scheme and a modulation scheme for the stored information stored in the header, and at least one of an encoding scheme and a modulation scheme for the transmission data; a header processing unit that demodulates the modulation/encoding information and decodes the demodulated modulation/encoding information by predetermined schemes, and demodulates the stored information and decodes the demodulated stored information by schemes indicated by the modulation/encoding information obtained through the decoding; and a payload processing unit that demodulates and decodes the transmission data by schemes indicated by the modulation/encoding information obtained through the decoding or by schemes indicated by the modulation/encoding information and the stored information.

In one aspect of the present technology, transmission data stored in a payload is encoded and modulated, and modulation/encoding information is encoded and modulated by predetermined schemes, the modulation/encoding information indicating at least one of the schemes of encoding and modulation for stored information stored in a header, and at least one of the schemes of encoding and modulation for the transmission data. Also, the stored information is encoded and modulated by schemes indicated by the modulation/encoding information, and a frame formed by attaching the header to the payload is transmitted, the header being formed with a first region and a second region, the first region storing the modulation/encoding information, the second region storing the stored information.

In another aspect of the present technology, a frame formed by attaching a header to a payload storing transmission data is received, and modulation/encoding information is demodulated and the demodulated modulation/encoding information is decoded by predetermined schemes, the modulation/encoding information indicating at least one of the schemes of encoding and modulation for stored information stored in the header, and at least one of the schemes of encoding and modulation for the transmission data, the header being formed with a first region and a second region, the first region storing the modulation/encoding information, the second region storing the stored information. Also, the stored information is demodulated and the demodulated stored information is decoded by schemes indicated by the modulation/encoding information obtained through the decoding, and the transmission data is demodulated and decoded by schemes indicated by the modulation/encoding information obtained through the decoding or by schemes indicated by the modulation/encoding information and the stored information.

Effects of the Invention

According to the present technology, frames can be efficiently transmitted in accordance with the condition of the transmission path.

It should be noted that effects of the present technology are not limited to the effect described above, and may include any of the effects described in the present disclosure.

BRIEF DESCRIPTION OF DRAWINGS

FIG. 3 is a table showing example meanings of MCS.

MODE FOR CARRYING OUT THE INVENTION

The following is a description of an embodiment for carrying out the present technology. Explanation will be made in the following order.

1. Configuration of a wireless communication system
2. Example of a frame format
3. Configurations of the respective devices
4. Operations of the respective devices
5. Modifications 1. Configuration of a Wireless Communication System FIG. 1 is a diagram showing an example configuration of a wireless communication system according to an embodiment of the present technology.

Figure 1:
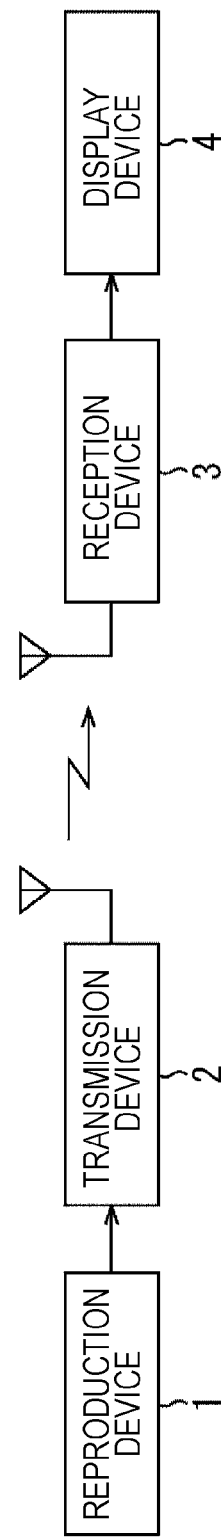
FIG. 1 is a diagram showing an example configuration of a wireless communication system according to an embodiment of the present technology.

The wireless communication system in FIG. 1 includes a reproduction device 1, a transmission device 2, a reception device 3, and a display device 4. The reproduction device 1 and the transmission device 2, and the reception device 3 and the display device 4 are connected to each other via a cable compliant with predetermined standards, such as a high definition multimedia interface (HDMI) (registered trademark) cable. The reproduction device 1 and the transmission device 2, and the reception device 3 and the display device 4 may be connected to each other via wireless communication.

The reproduction device 1 is a player of content such as video and audio content. The reproduction device 1 outputs audio-visual (AV) data obtained through reproduction, to the transmission device 2. Data other than AV data may be output as the current transmission data to the transmission device 2.

The transmission device 2 performs processing such as an encoding process and a modulation process on the AV data transmitted from the reproduction device 1. The transmission device 2 functions as an encoding device and a modulation device.

The transmission device 2 divides the AV data obtained through various processes into predetermined units, stores the units into payloads, and thus generates frames. The transmission device 2 transmits the respective frames to the reception device 3 through wireless communication using a predetermined frequency band such as a 60 GHz band.

The reception device 3 receives the signal transmitted from the transmission device 2, and performs processing such as a demodulation process and a decoding process on the received signal. The reception device 3 functions as a demodulation device and a decoding device.

The transmission device 2 generates AV data by extracting the data stored in the payloads of the respective frames obtained through various processes, and outputs the AV data to the display device 4.

The display device 4 is a device having a display unit, such as an LCD or an organic EL display. The display device 4 receives the AV data transmitted from the reception device 3, and displays a video image on the display and outputs sound from a speaker.

2. Example of a Frame Format

Figure 2:
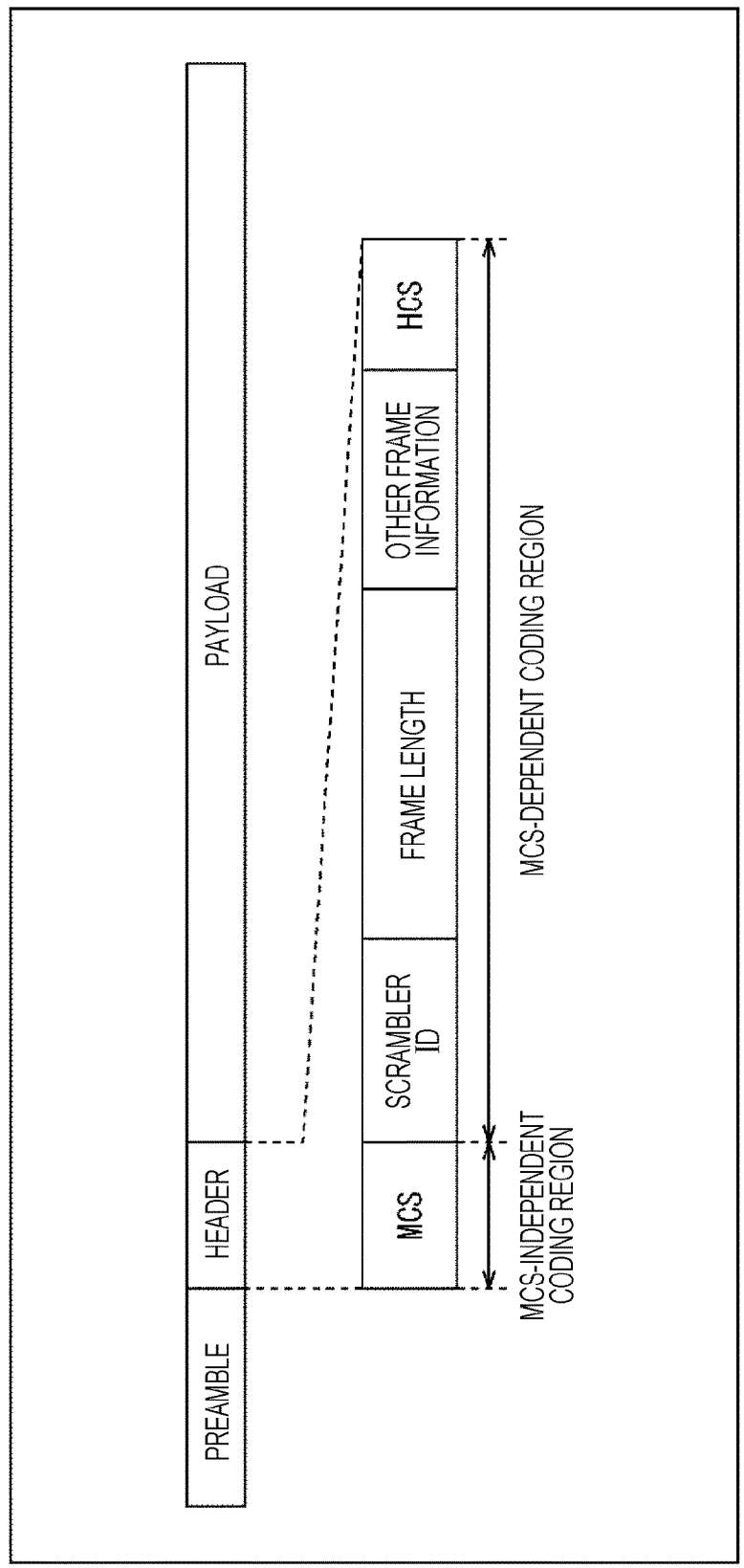
FIG. 2 is a diagram showing an example of a frame format.

FIG. 2 is a diagram showing an example of a frame format to be used in transmission/reception of data in the wireless communication system in FIG. 1.

One frame is formed with a preamble, a header (a physical layer header), and a payload.

The preamble is formed with repetitions of a known signal sequence that is used in frame detection. The known signal sequence normally includes a unique signal sequence to be used in frame synchronization, and a signal sequence to be used in transmission path characteristics evaluation.

The header stores the information necessary for demodulating and decoding the payload. The payload stores AV data that is the current user data to be transmitted.

As shown in FIG. 2, the header contains the modulation and coding scheme (MCS), the scrambler ID, the frame length, and the header check sequence (HCS). Other frame information necessary for demodulating and decoding the payload is inserted between the frame length and the HCS, where appropriate.

The MCS is the information about the modulation scheme and the encoding scheme for the header, and the modulation scheme and the encoding scheme for the payload. The MCS serving as modulation/encoding information indicates not only the modulation scheme and the encoding scheme for the payload but also the modulation scheme and the encoding scheme for the header.

The MCS is encoded and modulated by predetermined schemes. After detecting the top of the header, the reception device 3 performs demodulation and decoding by predetermined schemes to obtain the MCS, and, in accordance with the obtained MCS, demodulates and decodes the information following the MCS.

As indicated by a two-headed arrow in FIG. 2, the region of the scrambler ID, the frame length, the frame information, and the HCS is an MCS-dependent coding region in which the modulation scheme and the encoding scheme are dependent on the MCS. Meanwhile, the region of the MCS is an MCS-independent coding region in which the modulation scheme and the encoding scheme are not dependent on the contents of the MCS. A specific example of the MCS will be described later.

The scrambler ID is information such as the scramble initial value to be used in scrambling the payload or the header after the scrambler ID. Scrambling is performed by the transmission device 2 to prevent the transmission spectrum from being biased. In a case where a fixed signal sequence pattern is used, the transmission spectrum might be biased. In accordance with the scrambler ID, the reception device 3 descrambles the payload and the like.

The frame length is the information about the length of the payload. In accordance with the frame length, the reception device 3 ends demodulation and decoding of the payload.

The HCS is the parity word to be used in header error detection. In accordance with the HCS, the reception device 3 performs header error detection, and determines whether to demodulate and decode the payload.

FIG. 3 is a table showing example meanings of the MCS.

The modulation scheme for the MCS is binary phase shift keying (BPSK), for example. Meanwhile, the encoding scheme for the MCS is a spread encoding scheme with a spread rate of 24. The modulation scheme and the encoding scheme for the MCS are fixed schemes and are determined in advance.

As for the spread rate in spread coding, the MCS-independent coding region in the header is a region with a fixed spread rate in spread coding. On the other hand, the MCS-dependent coding region is a region with a variable spread rate in spread coding. Hereinafter, the MCS-independent coding region will be referred to as the fixed spread region, and the MCS-dependent coding region will be referred to as the variable spread region, when appropriate. In the example shown in FIG. 3, the encoding scheme for the information to be stored in the header is spread coding.

The MCS indicates the modulation scheme for the payload, and the code rate in payload error correction coding. The MCS also indicates the modulation scheme for the entire header including the MCS, and the respective spread rates in spread coding in the fixed spread region and the variable spread region.

In a case where the MCS number is 0, the payload is modulated by BPSK, and is subjected to error correction coding at a code rate of 11/15. Meanwhile, the header is modulated by BPSK, and is subjected to spread coding at a spread rate of 24.

In a case where the MCS number is 1, the payload is modulated by BPSK, and is subjected to error correction coding at a code rate of 14/15. Meanwhile, the header is modulated by BPSK, the information in the fixed spread region is subjected to spread coding at a spread rate of 24, and the information in the variable spread region is subjected to spread coding at a spread rate of 16.

In a case where the MCS number is 2, the payload is modulated by QPSK, and is subjected to error correction coding at a code rate of 11/15. Meanwhile, the header is modulated by BPSK, the information in the fixed spread region is subjected to spread coding at a spread rate of 24, and the information in the variable spread region is subjected to spread coding at a spread rate of 16.

In a case where the MCS number is 3, the payload is modulated by QPSK, and is subjected to error correction coding at a code rate of 14/15. Meanwhile, the header is modulated by BPSK, the information in the fixed spread region is subjected to spread coding at a spread rate of 24, and the information in the variable spread region is subjected to spread coding at a spread rate of 8.

In a case where the MCS number is 4, the payload is modulated by 16 QAM, and is subjected to error correction coding at a code rate of 11/15. Meanwhile, the header is modulated by BPSK, the information in the fixed spread region is subjected to spread coding at a spread rate of 24, and the information in the variable spread region is subjected to spread coding at a spread rate of 4.

In a case where the MCS number is 5, the payload is modulated by 16 QAM, and is subjected to error correction coding at a code rate of 14/15. Meanwhile, the header is modulated by BPSK, the information in the fixed spread region is subjected to spread coding at a spread rate of 24, and the information in the variable spread region is subjected to spread coding at a spread rate of 2.

As described above, the MCS set at the top of the header indicates the modulation scheme and the code rate in the error correction coding for the payload, and the modulation scheme and the spread rate in the spread coding for the header. Information indicating the meanings of the MCS as shown in FIG. 3 is stored beforehand in the memory of each of the transmission device 2 and the reception device 3.

If there is an error in the header, the payload is not correctly demodulated and decoded. Schemes with demodulation/decoding performance similar to that of the modulation and encoding schemes for the payload, or schemes with higher demodulation/decoding performance than that of the modulation and encoding schemes for the payload are selected as the modulation and encoding schemes for the header. The demodulation/decoding performance is overall performance in demodulation and decoding.

Further, if there is an error in the MCS, the information after the MCS in the header is not correctly demodulated and decoded. The schemes with the highest demodulation/decoding performance among the schemes that are used in modulating and encoding the information after the MCS are selected as the modulation and encoding schemes for the MCS.

In this example, BPSK is used in header demodulation. However, it is possible to use some other modulation scheme such as QPSK or 16 QAM. Also, the entire header is modulated by the same BPSK in this example. However, it is possible to use different modulation schemes for modulating the MCS and modulating the information after the MCS. The schemes with the highest overall demodulation/decoding performance among the schemes that are used in modulating and encoding the information after the MCS are selected for modulating the MCS.

Although the spread rate in the spread coding for the fixed spread region is fixed at 24, it is possible to use some other spread rate with which higher performance than the overall demodulation/decoding performance for the variable spread region can be achieved.

The combinations of a modulation scheme and an encoding scheme indicated by the MCS are not limited to those shown in FIG. 3. For example, the modulation scheme for the header in a case where the MCS number is 4 may be QPSK, the spread rate in the spread coding for the fixed spread region may be 12, and the spread rate in the spread coding for the variable spread region may be 2. Also, the modulation scheme for the header in a case where the MCS number is 5 may be QPSK, the spread rate in the spread coding for the fixed spread region may be 12, and the spread rate in the spread coding for the variable spread region may be 1. Where the spread rate in the spread coding is 1, encoding is not to be performed.

Further, in the example shown in FIG. 3, the numbers 0 through 5 are used as the MCS to indicate the combinations of a modulation scheme and an encoding scheme. However, numbers 6 and greater may be used to indicate a larger number of combinations.

Although the MCS indicates both the modulation scheme and the encoding scheme for the payload in the above example, the MCS may indicate one of these schemes. For example, in a case where the MCS indicates the modulation scheme for the payload, the encoding scheme for the payload is a predetermined scheme. In a case where the MCS indicates the encoding scheme for the payload, on the other hand, the modulation scheme for the payload is a predetermined scheme. In another example case where the MCS indicates the modulation scheme for the payload, the information indicating the encoding scheme for the payload is stored in the variable spread region. Likewise, in a case where the MCS indicates the encoding scheme for the payload, the information indicating the modulation scheme for the payload is stored in the variable spread region.

Also, the MCS indicates both the modulation scheme and the encoding scheme for the header in the above example, the MCS may indicate one of these schemes. For example, in a case where the MCS indicates the modulation scheme for the header, the encoding scheme for the header is a predetermined scheme. Also, in a case where the MCS indicates the encoding scheme for the header, the modulation scheme for the header is a predetermined scheme.

Figure 4:
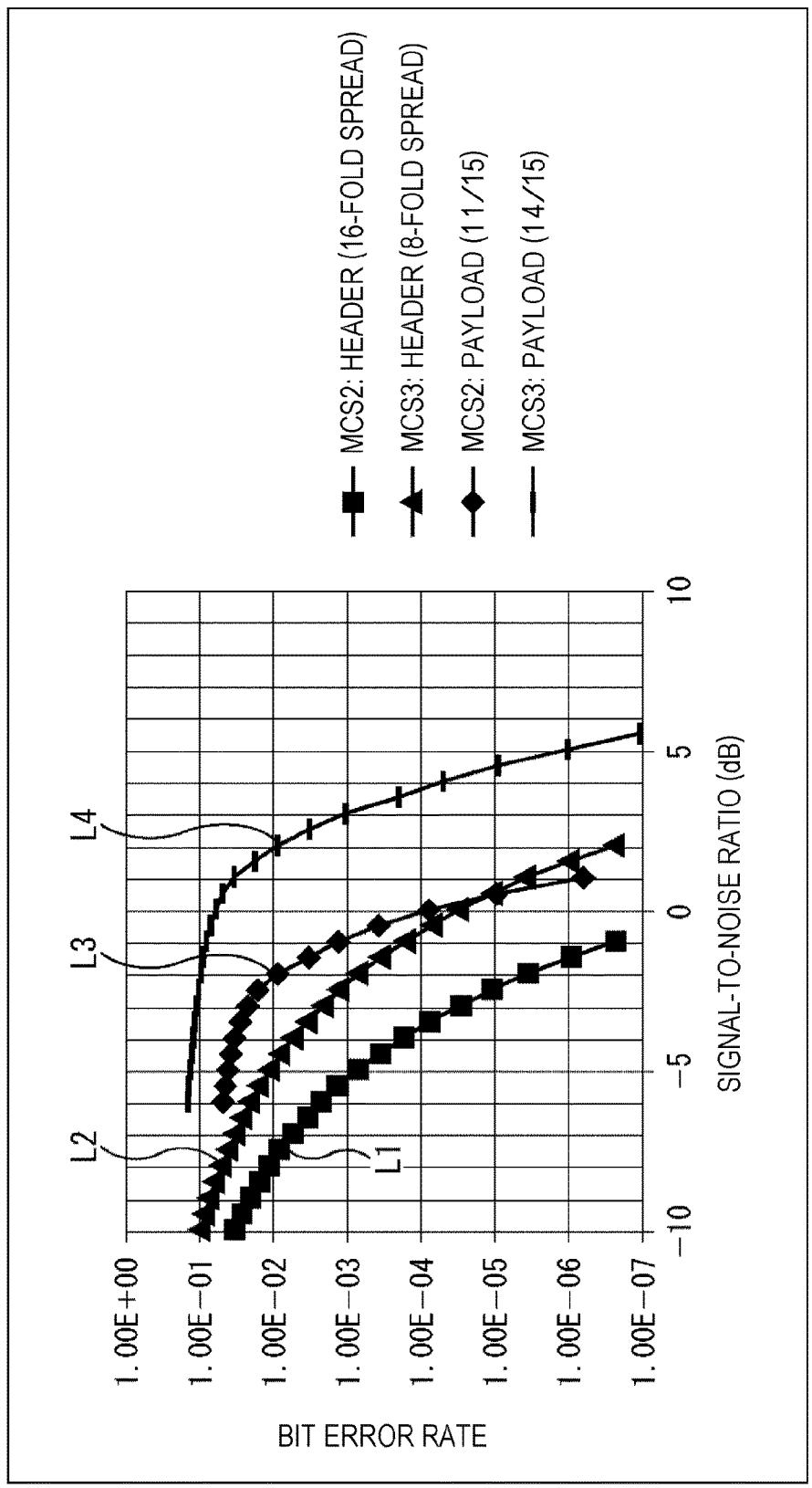
FIG. 4 is a graph showing examples of demodulation/decoding performance.

FIG. 4 is a graph showing examples of demodulation/decoding performance.

In FIG. 4, the abscissa axis indicates the signal-to-noise ratio (SNR), and the ordinate axis indicates the bit error rate after error correction. Curve L1 represents the header demodulation/decoding performance in a case where the MCS number is 2. Curve L2 represents the header demodulation/decoding performance in a case where the MCS number is 3. Curve L3 represents the payload demodulation/decoding performance in a case where the MCS number is 2. Curve L4 represents the payload demodulation/decoding performance in a case where the MCS number is 3.

The error correction code for the payload is a shortened code with a 12-byte information word length, as opposed to an LDPC code having a 180-byte code length.

As indicated by curve L1 and curve L3, in a case where the MCS number is 2, the SNR in the header demodulation/decoding performance when the bit error rate is 1E-6 is approximately 2.5 dB higher than that in the payload demodulation/decoding performance. Also, as indicated by curve L2 and curve L4, in a case where the MCS number is 3, the SNR in the header demodulation/decoding performance when the bit error rate is 1E-6 is approximately 3.5 dB higher than that in the payload demodulation/decoding performance.

In the case where the MCS number is 2 and the case where the MCS number is 3, the requirement that the header demodulation/decoding performance should be equal to or higher than the payload demodulation/decoding performance is satisfied.

As described above, in the wireless communication system in FIG. 1, schemes suitable for the condition of the transmission path can be selected as the modulation scheme and the encoding scheme for the payload, and such suitable schemes can also be selected as the modulation scheme and the encoding scheme for the information in the header other than the MCS.

In a case where the condition of the transmission path is good, the transmission device 2 selects a modulation scheme and an encoding scheme with lower demodulation/decoding performance, to reduce the redundancy of the entire header and increase the transmission efficiency.

Furthermore, the modulation schemes and the encoding schemes for both the header and the payload can be indicated by one piece of information. Accordingly, the transmission device 2 can have a higher transmission efficiency than in a case where the information indicating the modulation scheme and the encoding scheme for the header is prepared separately from the information indicating the modulation scheme and the encoding scheme for the payload.

That is, the transmission device 2 can efficiently transmit frames in accordance with the condition of the transmission path.

The processes to be performed by the transmission device 2 and the reception device 3 to transmit and receive data with the frame shown in FIG. 2 will be described later with reference to flowcharts.

3. Configurations of the Respective Devices

Configuration of the Transmission Device 2

Figure 5:
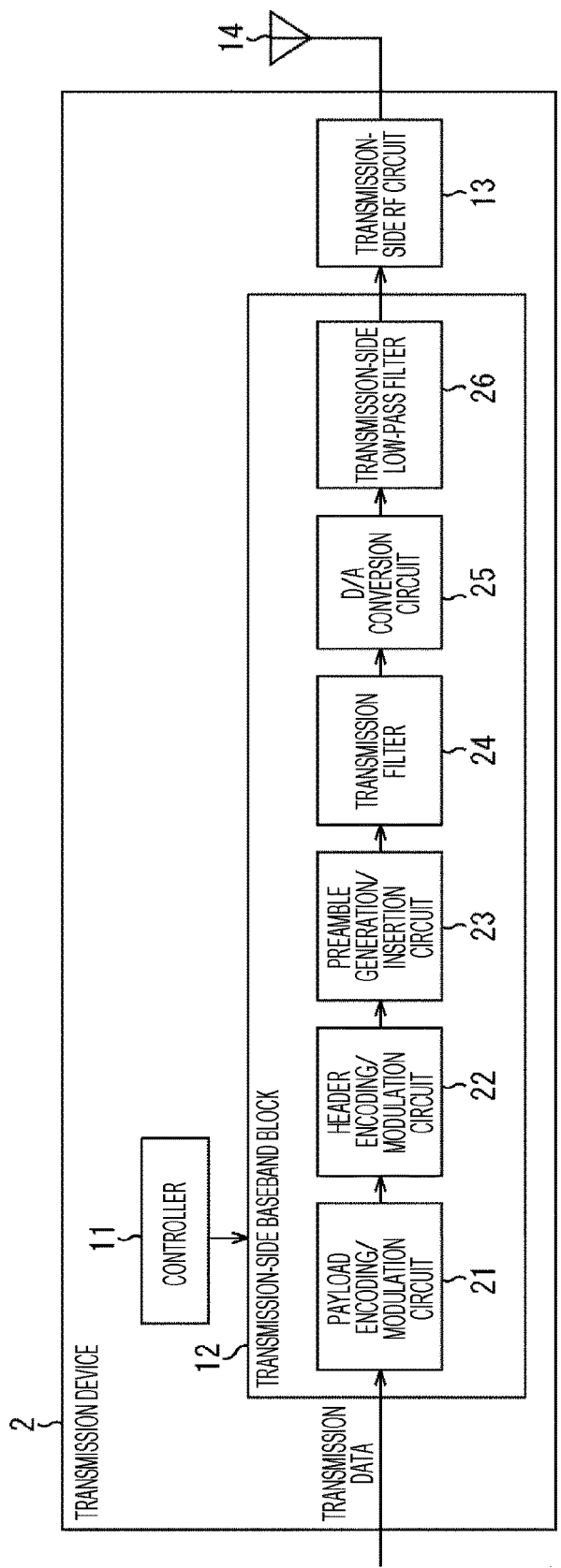
FIG. 5 is a block diagram showing an example configuration of a transmission device.

FIG. 5 is a block diagram showing an example configuration of the transmission device 2.

The transmission device 2 includes a controller 11, a transmission-side baseband block 12, a transmission-side RF circuit 13, and a transmission antenna 14.

The controller 11 includes a CPU, a ROM, and a RAM. The controller 11 executes a predetermined program, to control the entire operation of the transmission device 2.

For example, the controller 11 selects the modulation scheme and the encoding scheme for the variable spread region of the header, and the modulation scheme and the encoding scheme for the payload, in accordance with the condition of the transmission path. In the above described example case, the modulation scheme and the spread rate in the spread coding for the variable spread region of the header are selected. The modulation scheme and the code rate in the error correction coding for the payload are also selected.

The controller 11 outputs header-stored information including the MCS indicating the selected combinations to a header encoding/modulation circuit 22 of the transmission-side baseband block 12. The header-stored information is information that includes the MCS, the scrambler ID, the frame length, and other frame information. The controller 11 also outputs information indicating the modulation scheme and the code rate in the error correction coding for the payload to a payload encoding/modulation circuit 21 of the transmission-side baseband block 12.

The transmission-side baseband block 12 includes the payload encoding/modulation circuit 21, the header encoding/modulation circuit 22, a preamble generation/insertion circuit 23, a transmission filter 24, a digital-analog (D/A) conversion circuit 25, and a transmission-side low-pass filter 26. Transmission data that is the current transmission data is input to the payload encoding/modulation circuit 21 of the transmission-side baseband block 12.

In accordance with the transmission data, the payload encoding/modulation circuit 21 generates the parity to be used in error correction, and attaches the generated parity to the transmission data. By doing so, the payload encoding/modulation circuit 21 performs error correction coding. The error correction coding by the payload encoding/modulation circuit 21 is conducted in accordance with the code rate selected by the controller 11.

The payload encoding/modulation circuit 21 also modulates the encoded sequence obtained through the error correction coding. The modulation by the payload encoding/modulation circuit 21 is conducted in accordance with the scheme selected by the controller 11, such as phase shift keying or quadrature amplitude modulation. The payload encoding/modulation circuit 21 outputs the modulated transmission data to the header encoding/modulation circuit 22.

The header encoding/modulation circuit 22 generates a header including the header-stored information supplied from the controller 11, and performs spread coding on the generated header. The header spread coding by the header encoding/modulation circuit 22 is conducted in accordance with the spread rate selected by the controller 11.

The header encoding/modulation circuit 22 also modulates the encoded sequence of the header obtained by performing the spread coding. The header modulation by the header encoding/modulation circuit 22 is conducted in accordance with the scheme selected by the controller 11, such as quadrature amplitude modulation. The header encoding/modulation circuit 22 attaches the modulated header to the front of the payload storing the transmission data supplied from the payload encoding/modulation circuit 21, and outputs the header and the payload.

The preamble generation/insertion circuit 23 generates a preamble by using a Golay code or the like, and attaches the preamble to the front of the header supplied from the header encoding/modulation circuit 22. The preamble generation/insertion circuit 23 outputs a transmission symbol representing the data of the frame formed with the preamble, the header, and the payload, to the transmission filter 24.

The transmission filter 24 performs filtering to put a band limitation on the transmission symbol supplied from the preamble generation/insertion circuit 23, and outputs the transmission symbol obtained as a result of the filtering.

The D/A conversion circuit 25 performs D/A conversion on the transmission symbol supplied from the transmission filter 24, and outputs an analog baseband signal.

The transmission-side low-pass filter 26 performs filtering on the analog baseband signal supplied from the D/A conversion circuit 25, to remove out-of-band noise and unwanted signal components from the analog baseband signal. The transmission-side low-pass filter 26 outputs the filtered analog baseband signal.

The transmission-side RF circuit 13 superimposes the analog baseband signal supplied from the transmission-side low-pass filter 26 on a predetermined frequency carrier, and transmits the resultant signal from the transmission antenna 14.

Figure 6:
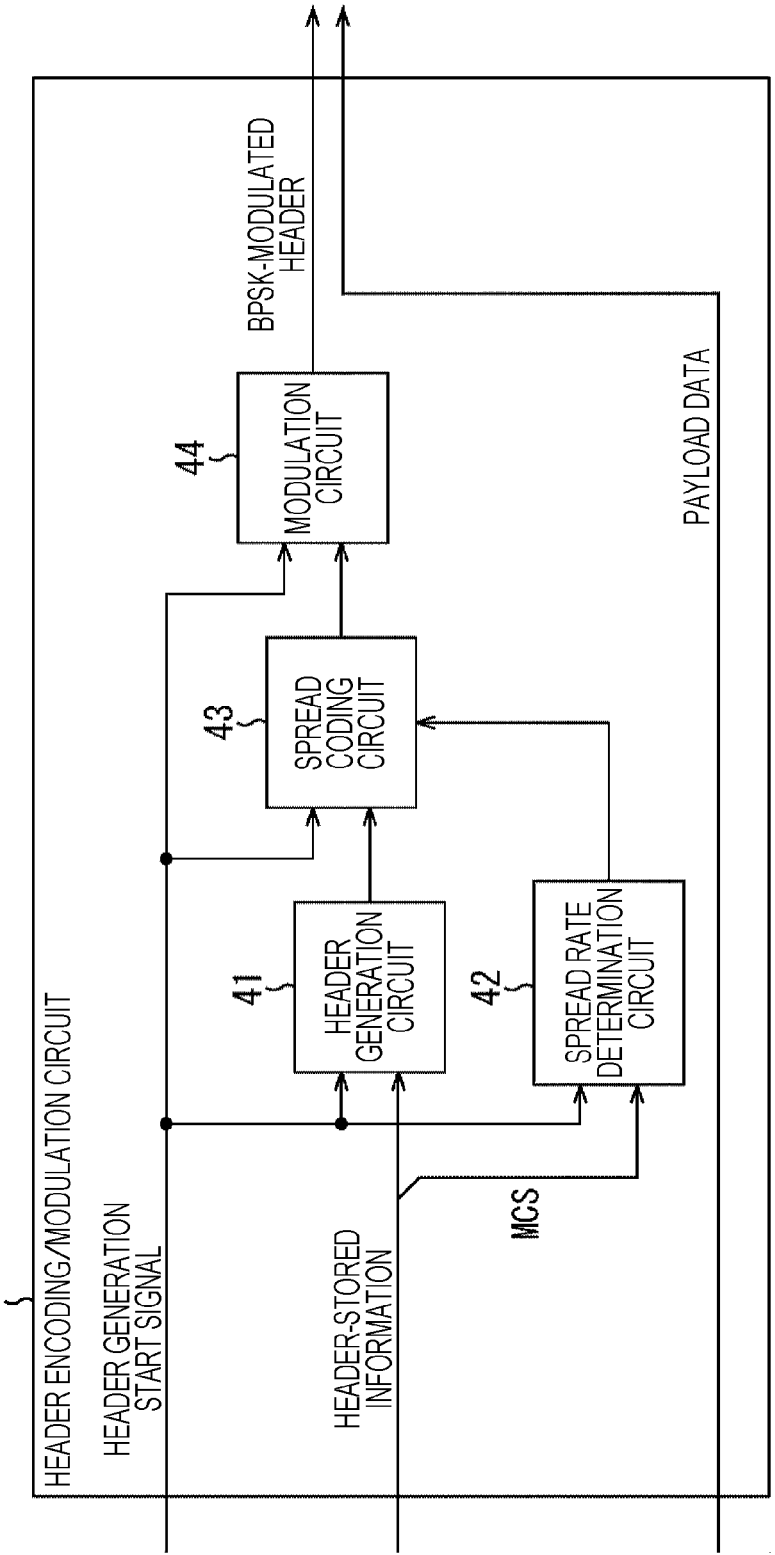
FIG. 6 is a block diagram showing an example configuration of the header encoding/modulation circuit in FIG. 5.

FIG. 6 is a block diagram showing an example configuration of the header encoding/modulation circuit 22 in FIG. 5.

The header encoding/modulation circuit 22 includes a header generation circuit 41, a spread rate determination circuit 42, a spread coding circuit 43, and a modulation circuit 44. The header generation by the header encoding/modulation circuit 22 is started when a header generation start signal output from the controller 11 changes from 0 to 1, for example. The header generation start signal is input to each component of the header encoding/modulation circuit 22. The header-stored information output from the controller 11 is input to the header generation circuit 41 at the same time as the start of the header generation, for example. Of the header-stored information, the MCS is also input to the spread rate determination circuit 42.

The header generation circuit 41 rearranges the header-stored information supplied from the controller 11 in compliance with the sequence shown in FIG. 2, and generates an HCS in accordance with the rearranged information. The header generation circuit 41 outputs the header-stored information and the HCS to the spread coding circuit 43.

The spread rate determination circuit 42 determines the spread rate for the variable spread region in accordance with the MCS supplied from the controller 11. The spread rate for the variable spread region is determined in compliance with the rules shown in FIG. 3, for example. The spread rate determination circuit 42 outputs information indicating the determined spread rate to the spread coding circuit 43.

The spread coding circuit 43 performs spread coding on the header-stored information and the HCS supplied from the header generation circuit 41. The spread coding for the variable spread region is performed in accordance with the spread rate determined by the spread rate determination circuit 42.

For example, the spread coding circuit 43 performs spread coding at a spread rate of 24 on the MCS in the fixed spread region. The spread coding circuit 43 also performs spread coding on the information in the variable spread region, using a spread rate of 2 to 24 as determined by the spread rate determination circuit 42. The spread coding circuit 43 outputs a spread code sequence formed with the header-stored information and the HCS to the modulation circuit 44.

The modulation circuit 44 modulates the spread code sequence output from the spread coding circuit 43. The modulation of the spread code sequence is performed by a BPSK scheme in compliance with the rules shown in FIG. 3, for example. The modulation circuit 44 attaches the transmission symbol obtained through the modulation to the front of the transmission symbol of the payload, and outputs the result.

Configuration of the Reception Device 3

Figure 7:
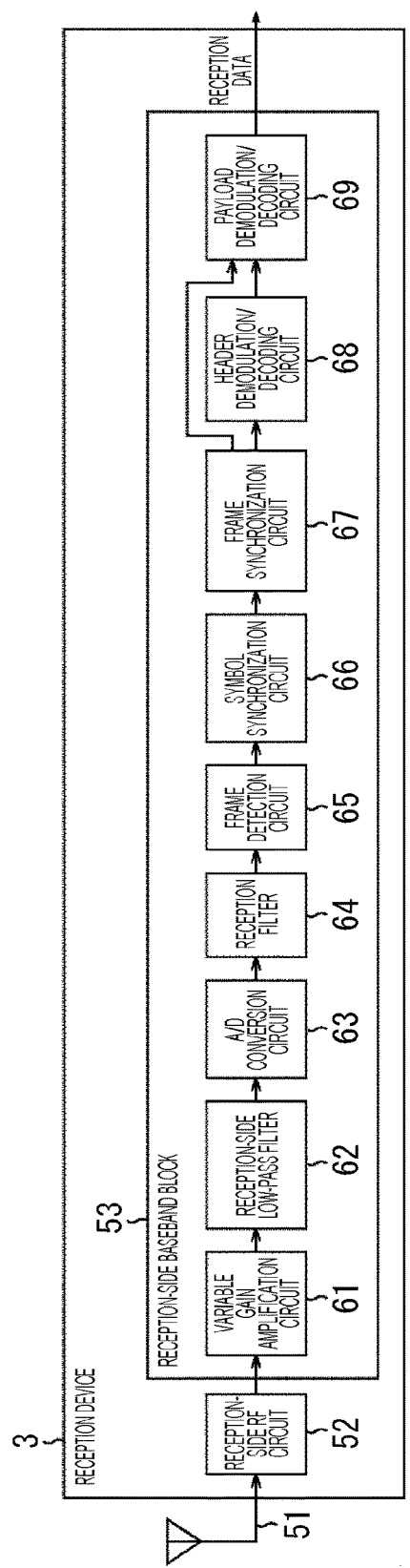
FIG. 7 is a block diagram showing an example configuration of a reception device.

FIG. 7 is a block diagram showing an example configuration of the reception device 3.

The reception device 3 includes a reception antenna 51, a reception-side RF circuit 52, and a reception-side baseband block 53. The reception-side baseband block 53 includes a variable gain amplification circuit 61, a reception-side low-pass filter 62, an A/D conversion circuit 63, a reception filter 64, a frame detection circuit 65, a symbol synchronization circuit 66, a frame synchronization circuit 67, a header demodulation/decoding circuit 68, and a payload demodulation/decoding circuit 69. A transmission signal transmitted from the transmission device 2 is received by the reception antenna 51, and is input as an RF signal to the reception-side RF circuit 52.

The reception-side RF circuit 52 converts the RF signal supplied from the reception antenna 51 into an analog baseband signal, and outputs the analog baseband signal.

The variable gain amplification circuit 61 of the reception-side baseband block 53 amplifies or attenuates the power of the analog baseband signal supplied from the reception-side RF circuit 52, in accordance with the dynamic range compatible with the A/D conversion circuit 63. The variable gain amplification circuit 61 outputs the power-adjusted analog baseband signal.

The reception-side low-pass filter 62 puts a band limitation on the analog baseband signal supplied from the variable gain amplification circuit 61. The band limitation by the reception-side low-pass filter 62 is put to prevent generation of a return signal at the time of A/D conversion. The reception-side low-pass filter 62 outputs the band-limited analog baseband signal.

The A/D conversion circuit 63 performs sampling on the analog baseband signal supplied from the reception-side low-pass filter 62, at, for example, sampling intervals Tp that are not synchronous with symbol intervals Ts. The A/D conversion circuit 63 outputs the reception signal obtained through the sampling.

The reception filter 64 performs filtering on the reception signal supplied from the A/D conversion circuit 63, so as to obtain a target equalized channel. The reception filter 64 outputs the equalized reception signal.

The frame detection circuit 65 detects a frame from the reception signal supplied from the reception filter 64, in accordance with the preamble of a known pattern, for example. The frame detection circuit 65 outputs the reception signal supplied from the reception filter 64, and a signal indicating that a frame has been received.

The symbol synchronization circuit 66 is formed with a finite impulse response (FIR) filter, for example. The symbol synchronization circuit 66 achieves symbol synchronization in accordance with the reception signal supplied from the reception filter 64, and outputs a reception symbol sequence.

The frame synchronization circuit 67 detects the pattern of the known synchronization signal sequence forming the preamble, for example, to detect the positions of the respective tops of the header and the payload. The frame synchronization circuit 67 outputs the reception symbol of the header to the header demodulation/decoding circuit 68, and outputs the reception symbol of the payload to the payload demodulation/decoding circuit 69.

The header demodulation/decoding circuit 68 demodulates and decodes the reception symbol of the header supplied from the frame synchronization circuit 67, and thus obtains the header-stored information. That is, the header demodulation/decoding circuit 68 demodulates the reception symbol modulated by a predetermined scheme such as quadrature amplitude modulation, and performs a decoding process by a predetermined scheme, to obtain the MCS. As described above, the MCS has been encoded and modulated by predetermined schemes.

The header demodulation/decoding circuit 68 also demodulates and decodes the header-stored information and the HCS following the MCS, by the schemes indicated by the MCS. In accordance with the HCS, the header demodulation/decoding circuit 68 performs error detection on the header-stored information obtained through the demodulation and the decoding. The header demodulation/decoding circuit 68 then outputs information indicating a result of the error detection, together with the header-stored information, to the payload demodulation/decoding circuit 69.

The payload demodulation/decoding circuit 69 demodulates the reception symbol of the payload supplied from the frame synchronization circuit 67, by the scheme indicated by the MCS supplied from the header demodulation/decoding circuit 68. The payload demodulation/decoding circuit 69 also decodes the error correction code obtained through the demodulation, in accordance with the code rate indicated by the MCS. The demodulation and the decoding by the payload demodulation/decoding circuit 69 are carried out in a case where the header-stored information is determined to be error-free as a result of the error detection performed by the header demodulation/decoding circuit 68.

The payload demodulation/decoding circuit 69 outputs the payload data obtained through the demodulation and the decoding, as reception data. The AV data that is the reception data output from the payload demodulation/decoding circuit 69 is output to the display device 4.

Figure 8:
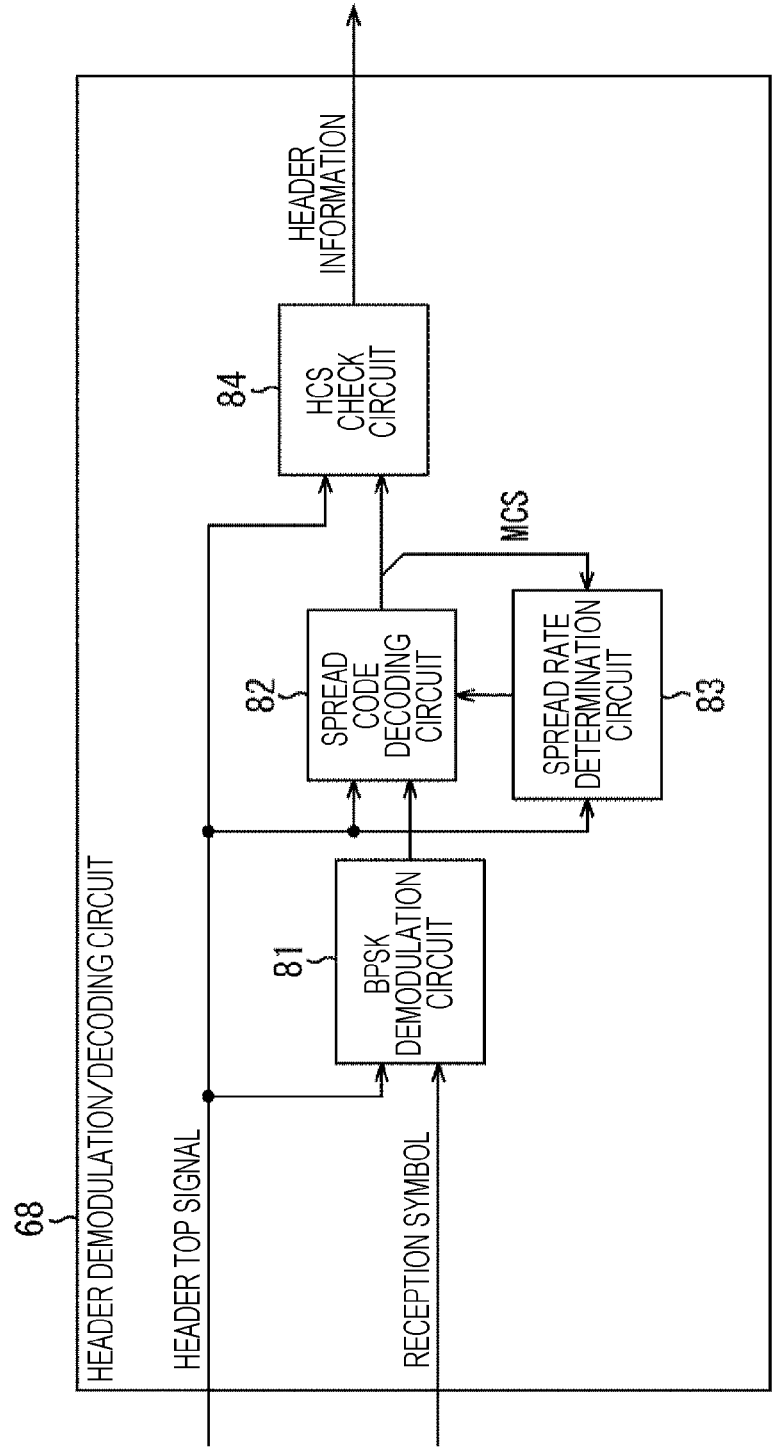
FIG. 8 is a block diagram showing an example configuration of the header demodulation/decoding circuit in FIG. 7.

FIG. 8 is a block diagram showing an example configuration of the header demodulation/decoding circuit 68 in FIG. 7.

The header demodulation/decoding circuit 68 includes a BPSK demodulation circuit 81, a spread code decoding circuit 82, a spread rate determination circuit 83, and an HCS check circuit 84. The header decoding by the header demodulation/decoding circuit 68 is started when a header top signal output from the frame synchronization circuit 67 changes from 0 to 1, for example. The header top signal is input to each component of the header demodulation/decoding circuit 68. The reception symbol of the header is input to the BPSK demodulation circuit 81 at the same time as the start of the header decoding, for example.

The BPSK demodulation circuit 81 demodulates the reception symbol of the header. The spread-coded sequence formed with the header-stored information and the HCS has been modulated by a BPSK scheme in compliance with the rules shown in FIG. 3, for example. The BPSK demodulation circuit 81 outputs the spread code sequence obtained through the BPSK demodulation, to the spread code decoding circuit 82.

The spread code decoding circuit 82 decodes the spread code sequence supplied from the BPSK demodulation circuit 81. First, the spread code decoding circuit 82 decodes the fixed spread region at a spread rate of 24. The encoding scheme for the MCS in the fixed spread region is a predetermined scheme, and is the spread coding at the spread rate of 24 in the example shown in FIG. 3. The spread code decoding circuit 82 outputs the MCS obtained through the decoding of the fixed spread region, to the spread rate determination circuit 83.

In accordance with the MCS, the spread rate determination circuit 83 determines the spread rate for the variable spread region, and feeds the spread rate back to the spread code decoding circuit 82.

In accordance with the spread rate determined by the spread rate determination circuit 83, the spread code decoding circuit 82 decodes the variable spread region, and obtains the header-stored information and the HCS following the MCS. The spread code decoding circuit 82 outputs the header-stored information and the HCS to the HCS check circuit 84.

In accordance with the MCS decoded by the spread code decoding circuit 82, the spread rate determination circuit 83 determines the spread rate for the variable spread region. The spread rate for the variable spread region is determined in compliance with the rules shown in FIG. 3, for example. The spread rate determination circuit 83 outputs information indicating the determined spread rate to the spread code decoding circuit 82.

Using the HCS, the HCS check circuit 84 performs error detection on the header-stored information supplied from the spread code decoding circuit 82. The HCS check circuit 84 outputs information indicating a result of the error detection, together with the header-stored information.

4. Operations of the Respective Devices

Next, processes to be performed by the transmission device 2 and the reception device 3 having the above described configurations are described.

Operation of the Transmission Device 2

Figure 9:
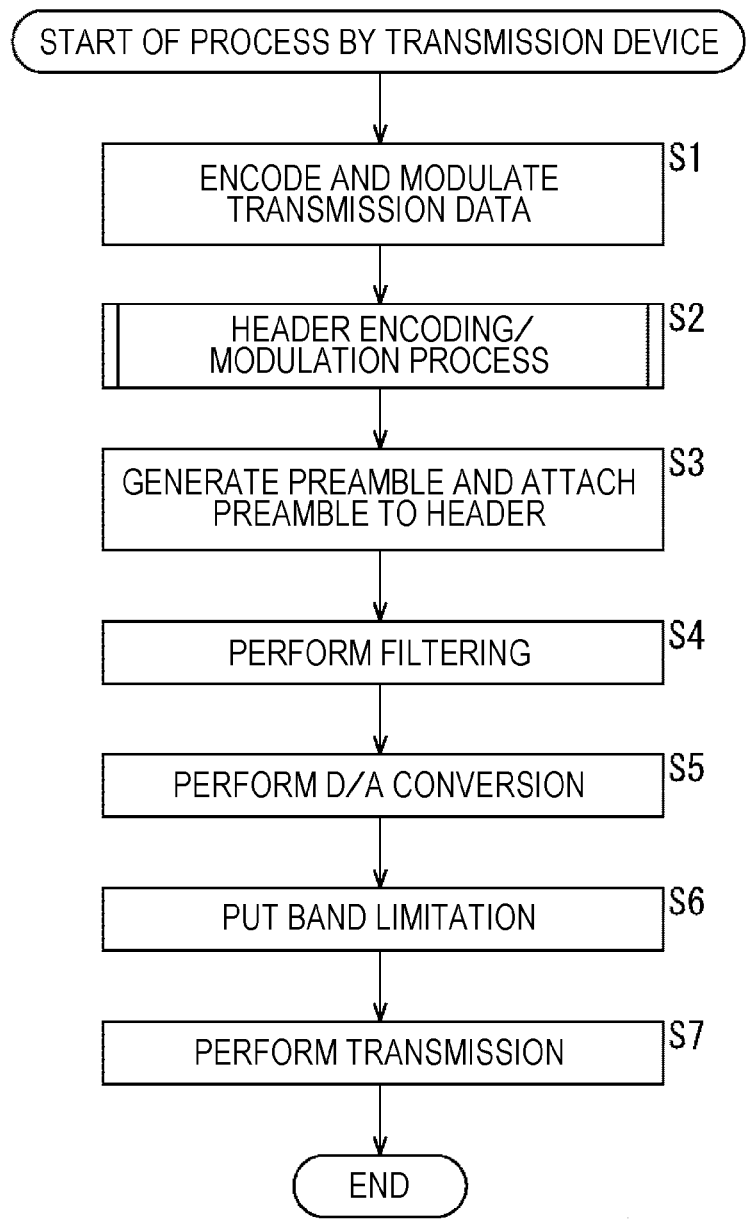
FIG. 9 is a flowchart for explaining a transmission process to be performed by the transmission device.

Referring first to the flowchart in FIG. 9, a transmitting process to be performed by the transmission device 2 is described.

The process shown in FIG. 9 is started when data output from the reproduction device 1 is input to the transmission device 2, for example. The modulation scheme and the spread rate in the spread coding for the variable spread region of the header, and the modulation scheme and the code rate in the error correction coding for the payload are selected beforehand by the controller 11.

In step S1, the payload encoding/modulation circuit 21 performs error correction coding on transmission data in accordance with the code rate selected by the controller 11. The payload encoding/modulation circuit 21 also modulates the encoded sequence obtained through the error correction coding, in compliance with the scheme selected by the controller 11.

In step S2, the header encoding/modulation circuit 22 performs a header encoding/modulation process. The header generated through the header encoding/modulation process is attached to the payload storing the transmission data, and is then output. The header encoding/modulation process will be described later with reference to the flowchart in FIG. 10.

In step S3, the preamble generation/insertion circuit 23 generates a preamble, and attaches the preamble to the front of the header supplied from the header encoding/modulation circuit 22. A transmission symbol representing the data of the frame formed with the preamble, the header, and the payload is supplied to the transmission filter 24.

In step S4, the transmission filter 24 performs filtering on the transmission symbol supplied from the preamble generation/insertion circuit 23.

In step S5, the D/A conversion circuit 25 performs D/A conversion on the transmission symbol filtered by the transmission filter 24, and outputs an analog baseband signal.

In step S6, the transmission-side low-pass filter 26 performs filtering on the analog baseband signal supplied from the D/A conversion circuit 25, to put a band limitation on the analog baseband signal.

In step S7, from the transmission antenna 14, the transmission-side RF circuit 13 transmits the analog baseband signal supplied from the transmission-side low-pass filter 26. The above process is repeated while transmission data is input.

Figure 10:
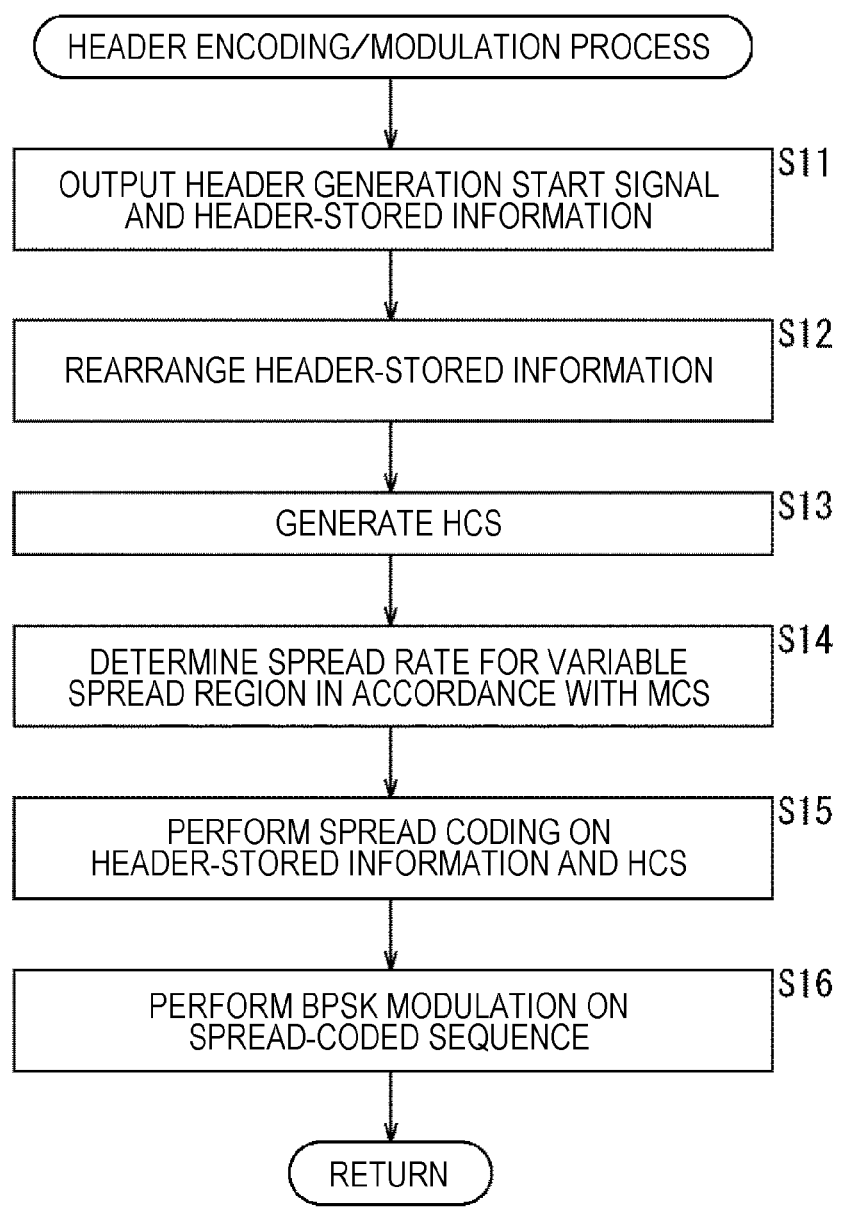
FIG. 10 is a flowchart for explaining the header encoding/modulation process to be performed in step S2 in FIG. 9.

Referring now to the flowchart in FIG. 10, the header encoding/modulation process to be performed in step S2 in FIG. 9 is described.

In step S11, the controller 11 outputs a header generation start signal and the header-stored information to the header encoding/modulation circuit 22. The header-stored information output from the controller 11 includes the MCS indicating the combinations of the modulation scheme and the spread rate in the spread coding for the variable spread region of the header, and the modulation scheme and the code rate in the error correction coding for the payload.

In step S12, the header generation circuit 41 rearranges the header-stored information supplied from the controller 11.

In step S13, the header generation circuit 41 generates an HCS in accordance with the header-stored information rearranged in compliance with the sequence shown in FIG. 2.

In step S14, the spread rate determination circuit 42 determines the spread rate for the variable spread region, in accordance with the MCS included in the header-stored information.

In step S15, the spread coding circuit 43 performs spread coding on the header-stored information and the HCS generated by the header generation circuit 41. The spread coding circuit 43 performs spread coding on the fixed spread region at a predetermined spread rate, and performs spread coding on the variable spread region at the spread rate determined by the spread rate determination circuit 42.

In step S16, the modulation circuit 44 modulates the spread code sequence in the fixed spread region by a predetermined scheme, and modulates the spread code sequence in the variable spread region by the scheme selected by the controller 11. After that, the process returns to step S2 in FIG. 9, and step S2 and the later steps are carried out.

Operation of the Reception Device 3

Figure 11:
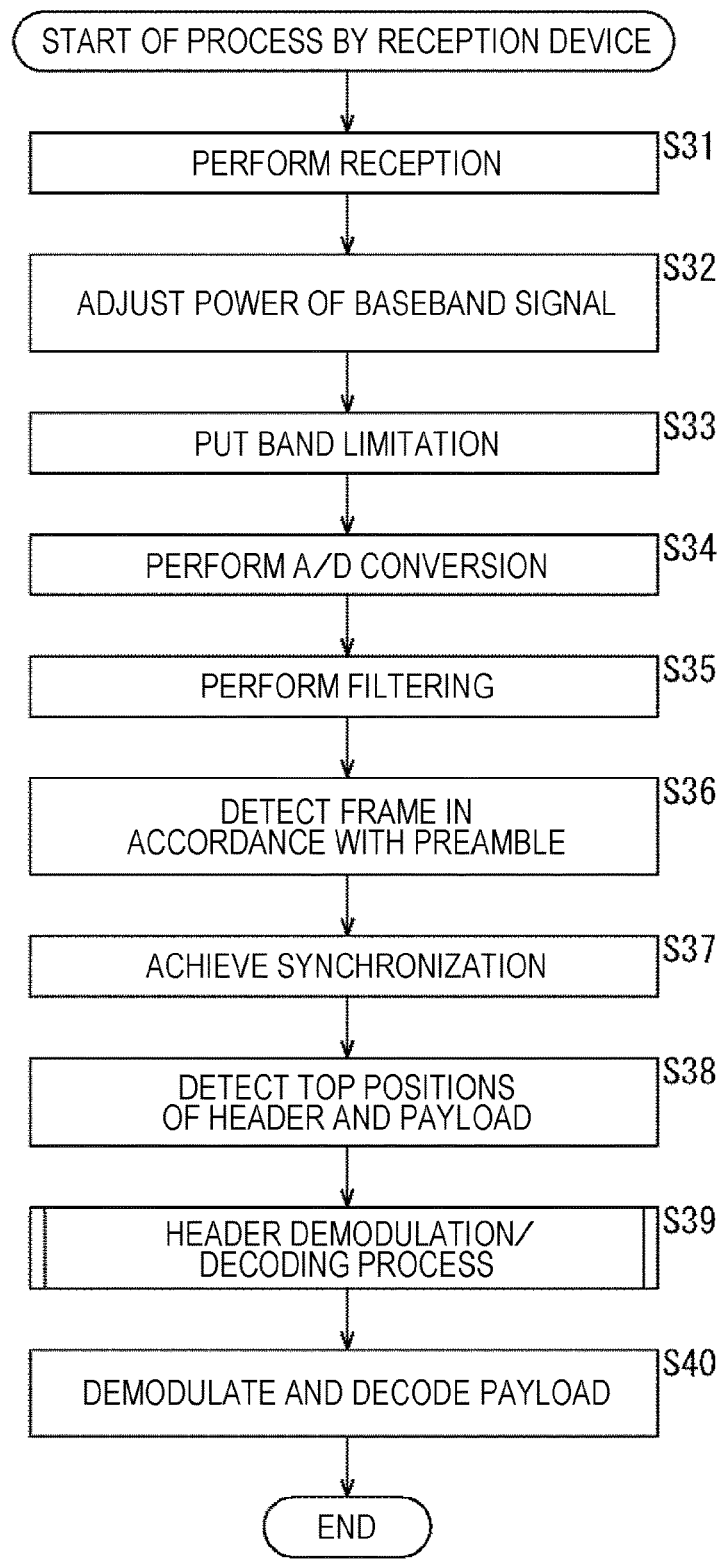
FIG. 11 is a flowchart for explaining a reception process to be performed by the reception device.

Referring now to the flowchart in FIG. 11, a reception process to be performed by the reception device 3 is described.

In step S31, the reception-side RF circuit 52 receives an RF signal supplied from the reception antenna 51, and converts the RF signal into an analog baseband signal.

In step S32, the variable gain amplification circuit 61 of the reception-side baseband block 53 adjusts the power of the analog baseband signal supplied from the reception-side RF circuit 52.

In step S33, the reception-side low-pass filter 62 puts a band limitation on the analog baseband signal supplied from the variable gain amplification circuit 61.

In step S34, the A/D conversion circuit 63 performs A/D conversion on the analog baseband signal supplied from the reception-side low-pass filter 62.

In step S35, the reception filter 64 performs filtering on the reception signal supplied from the A/D conversion circuit 63, and outputs the equalized reception signal.

In step S36, the frame detection circuit 65 detects the frame from the equalized reception signal, in accordance with the preamble.

In step S37, the symbol synchronization circuit 66 performs symbol synchronization, and outputs a reception symbol sequence.

In step S38, the frame synchronization circuit 67 detects the pattern of the known synchronization signal sequence forming the preamble, to detect the positions of the respective tops of the header and the payload. The reception symbol of the header is supplied to the header demodulation/ decoding circuit 68, and the reception symbol of the payload is supplied to the payload demodulation/decoding circuit 69.

In step S39, the header demodulation/decoding circuit 68 performs a header demodulation/decoding process. The header-stored information obtained through the header demodulation/decoding process is output, together with information indicating a result of the error detection performed on the header-stored information, to the payload demodulation/decoding circuit 69. The header demodulation/decoding process will be described later with reference to the flowchart in FIG. 12.

In step S40, the payload demodulation/decoding circuit 69 demodulates the reception symbol of the payload supplied from the frame synchronization circuit 67. The demodulation of the reception symbol is conducted by the scheme indicated by the MCS included in the header-stored information obtained through the header demodulation/decoding process.

The payload demodulation/decoding circuit 69 also decodes the error correction code obtained through the demodulation, in accordance with the code rate indicated by the MCS. The reception data obtained through the demodulation and the decoding is output to the display device 4. The above process is repeated while signals transmitted from the transmission device 2 are received.

Figure 12:
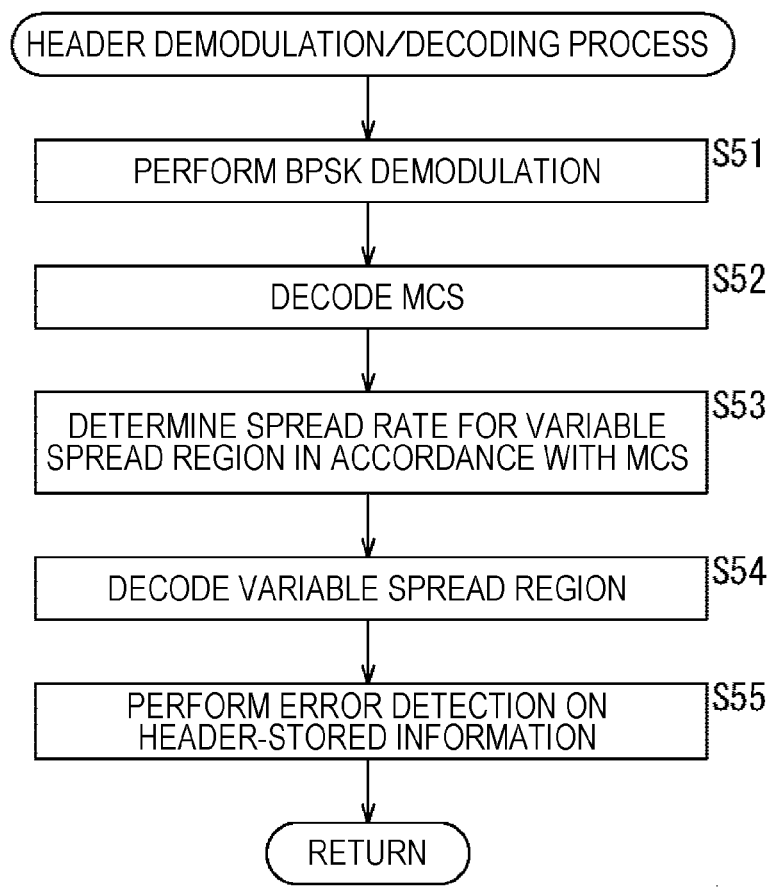
FIG. 12 is a flowchart for explaining the header demodulation/decoding process to be performed in step S39 in FIG. 11.

Referring now to the flowchart in FIG. 12, the header demodulation/decoding process to be performed in step S39 in FIG. 11 is described.

In step S51, the BPSK demodulation circuit 81 performs BPSK demodulation on the reception symbol of the header. The BPSK demodulation circuit 81 outputs the spread code sequence obtained through the BPSK demodulation, to the spread code decoding circuit 82.

In step S52, the spread code decoding circuit 82 obtains the MCS by decoding the fixed spread region at a predetermined spread rate.

In step S53, the spread rate determination circuit 83 determines the spread rate for the variable spread region in accordance with the MCS.

In step S54, in accordance with the spread rate determined by the spread rate determination circuit 83, the spread code decoding circuit 82 decodes the variable spread region, and obtains the information and the HCS following the MCS included in the header-stored information.

In step S55, using the HCS, the HCS check circuit 84 performs error detection on the header-stored information supplied from the spread code decoding circuit 82. The HCS check circuit 84 outputs information indicating a result of the error detection, together with the header-stored information. After that, the process returns to step S39 in FIG. 11, and step S39 and the later steps are carried out.

Through the above series of processes, frames can be efficiently transmitted in accordance with the condition of the transmission path.

5. Modifications

Although the case where the modulation scheme for the fixed spread region of the header and the modulation scheme for the variable spread region are the same BPSK scheme has been described in detail, different schemes may be used for the fixed spread region and the variable spread region.

In that case, the modulation circuit 44 in FIG. 6 modulates the spread code sequence in the fixed spread region output from the spread coding circuit 43 by a predetermined scheme, and modulates the spread code sequence in the variable spread region by the scheme determined by the spread rate determination circuit 42.

Meanwhile, the BPSK demodulation circuit 81 in FIG. 8 demodulates the reception symbol of the fixed spread region by a predetermined scheme. The spread code decoding circuit 82 obtains the MCS by decoding the spread-coded sequence in the fixed spread region by a predetermined scheme. In accordance with the obtained MCS, the BPSK demodulation circuit 81 determines the demodulation scheme for the variable spread region, and demodulates the reception symbol of the variable spread region. The demodulation scheme for the variable spread region may not necessarily be determined by the BPSK demodulation circuit 81, but the mechanism of determining the demodulation scheme for the variable spread region in accordance with the MCS may be provided in the header demodulation/decoding circuit 68.

As described above, in a case where the MCS indicates either the modulation scheme or the encoding scheme for the payload, the header encoding/modulation circuit 22 can incorporate information indicating the other scheme into the header-stored information, and thus store the information in the variable spread region. In this case, the payload demodulation/decoding circuit 69 demodulates and decodes the payload in accordance with the MCS and the information that indicates the other scheme and is included in the header-stored information. That is, the payload demodulation/decoding circuit 69 performs either a demodulation process or a decoding process in accordance with the scheme indicated by the MCS, and performs the other process in accordance with the scheme indicated by the information included in the header-stored information.

Modification of the Format

The header is divided into two regions, and the two regions can be encoded and modulated by different schemes from each other. However, the header may be divided into a larger number of regions, and the regions can be encoded and modulated by different schemes from one another.

For example, the transmission device 2 may encode and modulate the MCS, the scrambler ID, the frame length, and the other frame information included in header-stored information, using different schemes from one another. In this case, numbers indicating the combinations of schemes by which encoding and modulation have been performed on the respective pieces of information are set in the MCS at the top of the header.

Modification of the Wireless Communication System

Figure 13:
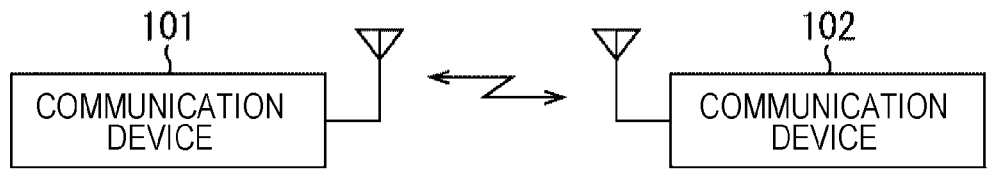
FIG. 13 is a diagram showing another example configuration of a wireless communication system.

FIG. 13 is a diagram showing another example configuration of a wireless communication system.

The communication device 101 and the communication device 102 shown in FIG. 13 have the configuration of the transmission device 2 shown in FIG. 5 and the configuration of the reception device 3 shown in FIG. 7, respectively. Alternatively, the configuration of the transmission device 2 shown in FIG. 5 and the configuration of the reception device 3 shown in FIG. 7 can be provided in one apparatus.

The communication device 101 and the communication device 102 can encode and modulate transmission data and header-stored information in the above described manner, and transmit data with frames in the format shown in FIG. 2. The communication device 101 and the communication device 102 can also demodulate and decode a reception signal in the above described manner, and obtain transmission data and header-stored information.

Alternatively, the communication device 101 can be provided in the reproduction device 1, and the communication device 102 can be provided in the display device 4.

Example Configuration of a Computer

The above described series of processes can be performed by hardware, and can also be performed by software. In a case where the series of processes are performed by software, the program that forms the software may be installed in a computer incorporated into special-purpose hardware, or may be installed from a program recording medium into a general-purpose personal computer or the like.

Figure 14:
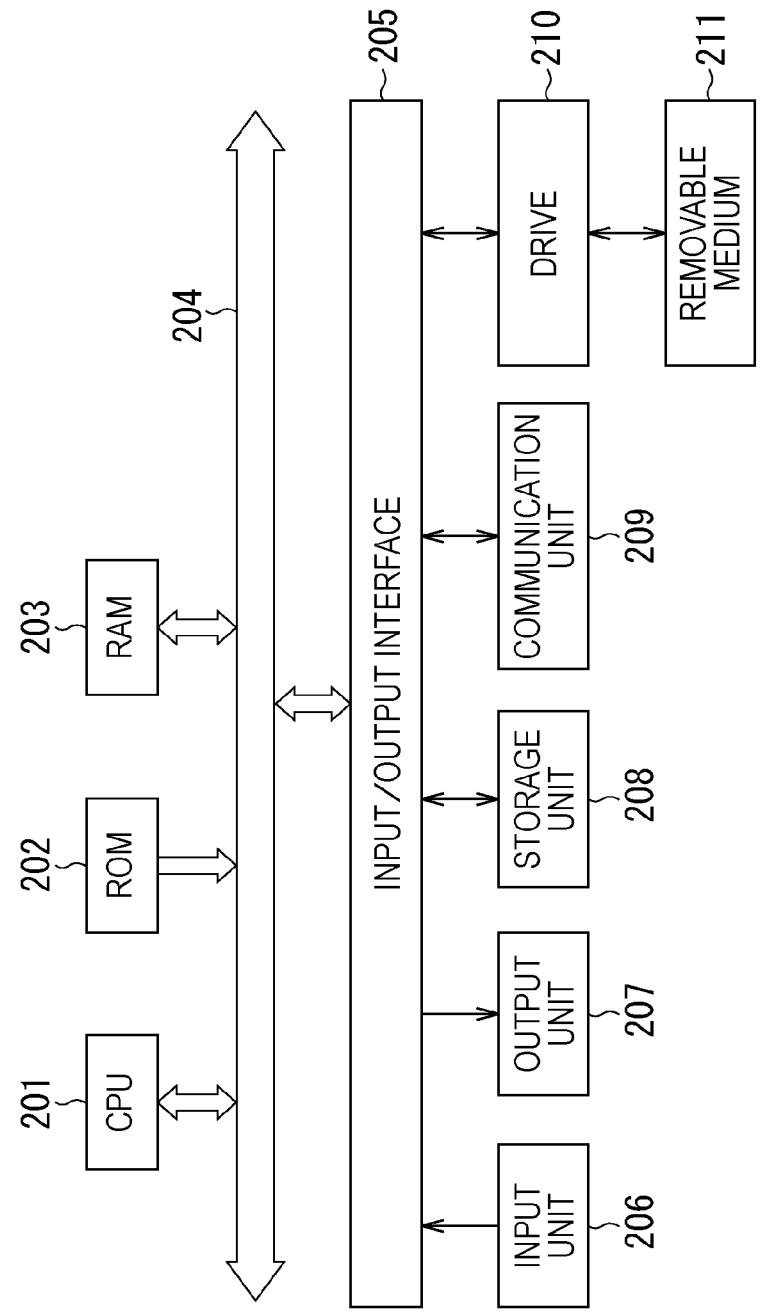
FIG. 14 is a block diagram showing an example configuration of a computer.

FIG. 14 is a block diagram showing an example configuration of the hardware of a computer that performs the above-described series of processes in accordance with a program.

A central processing unit (CPU) 201, a read only memory (ROM) 202, and a random access memory (RAM) 203 are connected to one another by a bus 204.

An input/output interface 205 is further connected to the bus 204. An input unit 206 formed with a keyboard, a mouse, and the like, and an output unit 207 formed with a display, a speaker, and the like are connected to the input/output interface 205. Further, a storage unit 208 formed with a hard disk, a nonvolatile memory, or the like, a communication unit 209 formed with a network interface or the like, and a drive 210 that drives a removable medium 211 are connected to the input/output interface 205.

In the computer having the above described configuration, the CPU 201 loads a program stored in the storage unit 208 into the RAM 203 via the input/output interface 205 and the bus 204, for example, and executes the program, so that the above described series of processes are performed.

The program to be executed by the CPU 201 is recorded in the removable medium 211 and is thus provided, for example, or is provided via a wired or wireless transmission medium, such as a local area network, the Internet, or digital broadcasting. The program is then installed into the storage unit 208.

It should be noted that the program to be executed by a computer may be a program for performing processes in chronological order in accordance with the sequence described in this specification, or may be a program for performing processes in parallel or performing a process when necessary, such as when there is a call.

It should be noted that embodiments of the present technology are not limited to the above described embodiment, and various modifications may be made to it without departing from the scope of the present technology.

For example, the present technology can be embodied in a cloud computing configuration in which one function is shared among devices via a network, and processing is performed by the devices cooperating with one another.

Also, the respective steps described with reference to the above described flowcharts can be carried out by one device or can be shared among devices.

Further, in a case where more than one process is included in one step, the processes included in the step can be performed by one device or can be shared among devices.

In this specification, a system means an assembly of components (devices, modules (parts), and the like), and not all the components need to be provided in the same housing. In view of this, devices that are housed in different housings and are connected to one another via a network form a system, and one device having modules housed in one housing is also a system.

Meanwhile, communication is, of course, wireless communication or cable communication, or may be communication in which wireless communication and cable communication coexist. Specifically, wireless communication may be performed in one area while cable communication is performed in another. Further, communication from one device to another device may be cable communication while communication from the other device to the one device is wireless communication.

The advantageous effects described in this specification are merely examples, and the advantageous effects of the present technology are not limited to them or may include other effects.

Example Combinations of Configurations

The present technology may also be embodied in the configurations described below.

(1)

An encoding device including:

a payload processing unit that encodes and modulates transmission data stored in a payload;

a header processing unit that encodes and modulates modulation/encoding information by predetermined schemes, and encodes and modulates stored information by schemes indicated by the modulation/encoding information, the modulation/encoding information indicating at least one of an encoding scheme and a modulation scheme for the stored information stored in a header, and at least one of an encoding scheme and a modulation scheme for the transmission data; and a transmission unit that transmits the frame formed by attaching the header to the payload, the header being formed with a first region and a second region, the first region storing the modulation/encoding information, the second region storing the stored information.

(2)

The encoding device of (1), further including a generation unit that generates a parity to be stored in the second region, the parity being used in error detection to be performed on the modulation/encoding information and the stored information, in which the header processing unit encodes and modulates the parity by schemes indicated by the modulation/encoding information.

(3)

The encoding device of (1) or (2), in which the first region is located at the top of the header.

(4)

The encoding device of any of (1) to (3), in which the header processing unit encodes the modulation/encoding information by the scheme with the highest decoding performance among a plurality of schemes to be used in encoding the stored information, and modulates the encoded modulation/encoding information by the scheme with the highest demodulation performance among a plurality of schemes to be used in modulating the stored information.

(5)

The encoding device of any of (1) to (4), in which the header processing unit encodes the stored information by a scheme with equal decoding performance to or higher decoding performance than the scheme to be used in encoding the transmission data, and modulates the encoded stored information by a scheme with equal decoding performance to or higher demodulation performance than the scheme to be used in modulating the transmission data.

(6)

An encoding method including the steps of:

encoding and modulating transmission data stored in a payload;

encoding and modulating modulation/encoding information by predetermined schemes, the modulation/encoding information indicating at least one of an encoding scheme and a modulation scheme for stored information stored in a header, and at least one of an encoding scheme and a modulation scheme for the transmission data;

encoding and modulating the stored information by schemes indicated by the modulation/encoding information; and transmitting the frame formed by attaching the header to the payload, the header being formed with a first region and a second region, the first region storing the modulation/encoding information, the second region storing the stored information.

(7)

A program for causing a computer to perform a process including the steps of:

encoding and modulating transmission data stored in a payload;

encoding and modulating modulation/encoding information by predetermined schemes, the modulation/encoding information indicating at least one of an encoding scheme and a modulation scheme for stored information stored in a header, and at least one of an encoding scheme and a modulation scheme for the transmission data;

encoding and modulating the stored information by schemes indicated by the modulation/encoding information; and transmitting the frame formed by attaching the header to the payload, the header being formed with a first region and a second region, the first region storing the modulation/encoding information, the second region storing the stored information.

(8)

A decoding device including:

a reception unit that receives a frame, the frame being formed by attaching a header to a payload storing transmission data, the header being formed with a first region and a second region, the first region storing modulation/encoding information, the second region storing stored information, the modulation/encoding information indicating at least one of an encoding scheme and a modulation scheme for the stored information stored in the header, and at least one of an encoding scheme and a modulation scheme for the transmission data;

a header processing unit that demodulates the modulation/encoding information and decodes the demodulated modulation/encoding information by predetermined schemes, and demodulates the stored information and decodes the demodulated stored information by schemes indicated by the modulation/encoding information obtained through the decoding; and a payload processing unit that demodulates and decodes the transmission data by schemes indicated by the modulation/encoding information obtained through the decoding or by schemes indicated by the modulation/encoding information and the stored information.

(9)

The decoding device of (8), further including a determination unit that determines a demodulation scheme and a decoding scheme for the stored information, in accordance with the modulation/encoding information obtained through the decoding.

(10)

The decoding device of (8) or (9), in which the second region further stores a parity to be used in error detection to be performed on the modulation/encoding information and the stored information, and the header processing unit demodulates and decodes the parity by schemes indicated by the modulation/encoding information obtained through the decoding.

(11)

The decoding device of (10), further including an error detection unit that performs error detection on the modulation/encoding information and the stored information, in accordance with the parity obtained through the decoding.

(12)

A decoding method including the steps of:

receiving a frame, the frame being formed by attaching a header to a payload storing transmission data, the header being formed with a first region and a second region, the first region storing modulation/encoding information, the second region storing stored information, the modulation/encoding information indicating at least one of an encoding scheme and a modulation scheme for the stored information stored in the header, and at least one of an encoding scheme and a modulation scheme for the transmission data;

demodulating the modulation/encoding information and decoding the demodulated modulation/encoding information by predetermined schemes;

demodulating the stored information and decoding the demodulated stored information by schemes indicated by the modulation/encoding information obtained through the decoding; and demodulating and decoding the transmission data by schemes indicated by the modulation/encoding information obtained through the decoding or by schemes indicated by the modulation/encoding information and the stored information.

(13)

A program for causing a computer to perform a process including the steps of:

receiving a frame, the frame being formed by attaching a header to a payload storing transmission data, the header being formed with a first region and a second region, the first region storing modulation/encoding information, the second region storing stored information, the modulation/encoding information indicating at least one of an encoding scheme and a modulation scheme for the stored information stored in the header, and at least one of an encoding scheme and a modulation scheme for the transmission data;

demodulating the modulation/encoding information and decoding the demodulated modulation/encoding information by predetermined schemes;

demodulating the stored information and decoding the demodulated stored information by schemes indicated by the modulation/encoding information obtained through the decoding; and demodulating and decoding the transmission data by schemes indicated by the modulation/encoding information obtained through the decoding or by schemes indicated by the modulation/encoding information and the stored information.

(14)

A wireless communication system including:

an encoding device including:

a payload processing unit that encodes and modulates transmission data stored in a payload;

a header processing unit that encodes and modulates modulation/encoding information by predetermined schemes, and encodes and modulates stored information by schemes indicated by the modulation/encoding information, the modulation/encoding information indicating at least one of an encoding scheme and a modulation scheme for the stored information stored in a header, and at least one of an encoding scheme and a modulation scheme for the transmission data; and a transmission unit that transmits the frame formed by attaching the header to the payload, the header being formed with a first region and a second region, the first region storing the modulation/encoding information, the second region storing the stored information; and a decoding device including:

a reception unit that receives the frame;

a header processing unit that demodulates the modulation/encoding information and decodes the demodulated modulation/encoding information by predetermined schemes, and demodulates the stored information and decodes the demodulated stored information by schemes indicated by the modulation/encoding information obtained through the decoding; and a payload processing unit that demodulates and decodes the transmission data by schemes indicated by the modulation/encoding information obtained through the decoding or by schemes indicated by the modulation/encoding information and the stored information.

REFERENCE SIGNS LIST

2 Transmission device
3 Reception device
11 Controller
21 Payload encoding/modulation circuit
22 Header encoding/modulation circuit
41 Header generation circuit
42 Spread rate determination circuit
43 Spread coding circuit
44 Modulation circuit
68 Header demodulation/decoding circuit
69 Payload demodulation/decoding circuit
81 BPSK demodulation circuit
82 Spread code decoding circuit
83 Spread rate determination circuit
84 HCS check circuit

The invention claimed is:

1. An encoding device comprising:
a payload processing unit configured to encode and modulate transmission data stored in a payload;
a header processing unit configured to encode and modulate modulation/encoding information by predetermined schemes, and encode and modulate stored information by schemes indicated by the modulation/encoding information, the modulation/encoding information indicating at least one of an encoding scheme and a modulation scheme for the stored information stored in a header, and at least one of an encoding scheme and a modulation scheme for the transmission data;
a transmission unit configured to transmit the frame formed by attaching the header to the payload, the header being formed with a first region and a second region, the first region storing the modulation/encoding information, the second region storing the stored information; and
a generation unit configured to generate a parity to be stored in the second region, the parity being used in error detection to be performed on the modulation/encoding information and the stored information,
wherein the header processing unit encodes and modulates the parity by schemes indicated by the modulation/encoding information.

2. The encoding device according to claim 1, wherein the first region is located at the top of the header.

3. An encoding device comprising:
a payload processing unit configured to encode and modulate transmission data stored in a payload;
a header processing unit configured to encode and modulate modulation/encoding information by predetermined schemes, and encode and modulate stored information by schemes indicated by the modulation/encoding information, the modulation/encoding information indicating at least one of an encoding scheme and a modulation scheme for the stored information stored in a header, and at least one of an encoding scheme and a modulation scheme for the transmission data; and
a transmission unit configured to transmit the frame formed by attaching the header to the payload, the header being formed with a first region and a second region, the first region storing the modulation/encoding information, the second region storing the stored information,
wherein the header processing unit encodes the modulation/encoding information by the scheme with the highest decoding performance among a plurality of schemes to be used in encoding the stored information, and modulates the encoded modulation/encoding information by the scheme with the highest demodulation performance among a plurality of schemes to be used in modulating the stored information.

4. An encoding device comprising:
a payload processing unit configured to encode and modulate transmission data stored in a payload;
a header processing unit configured to encode and modulate modulation/encoding information by predetermined schemes, and encode and modulate stored information by schemes indicated by the modulation/encoding information, the modulation/encoding information indicating at least one of an encoding scheme and a modulation scheme for the stored information stored in a header, and at least one of an encoding scheme and a modulation scheme for the transmission data; and
a transmission unit configured to transmit the frame formed by attaching the header to the payload, the header being formed with a first region and a second region, the first region storing the modulation/encoding information, the second region storing the stored information,
wherein the header processing unit encodes the stored information by a scheme with equal decoding performance to or higher decoding performance than a scheme to be used in encoding the transmission data, and modulates the encoded stored information by a scheme with equal decoding performance to or higher demodulation performance than a scheme to be used in modulating the transmission data.

5. A decoding device comprising:
a reception unit configured to receive a frame, the frame being formed by attaching a header to a payload storing transmission data, the header being formed with a first region and a second region, the first region storing modulation/encoding information, the second region storing stored information, the modulation/encoding information indicating at least one of an encoding scheme and a modulation scheme for the stored information stored in the header, and at least one of an encoding scheme and a modulation scheme for the transmission data;

a header processing unit configured to demodulate the modulation/encoding information and decode the demodulated modulation/encoding information by predetermined schemes, and demodulate the stored information and decode the demodulated stored information by schemes indicated by the modulation/encoding information obtained through the decoding; and a payload processing unit configured to demodulate and decode the transmission data by schemes indicated by the modulation/encoding information obtained through the decoding or by schemes indicated by the modulation/encoding information and the stored information, wherein the second region further stores a parity to be used in error detection to be performed on the modulation/encoding information and the stored information, and the header processing unit demodulates and decodes the parity by schemes indicated by the modulation/encoding information obtained through the decoding.

6. The decoding device according to claim 5, further comprising:

a determination unit configured to determine a demodulation scheme and a decoding scheme for the stored information, in accordance with the modulation/encoding information obtained through the decoding.

7. The decoding device according to claim 5, further comprising an error detection unit configured to perform error detection on the modulation/encoding information and the stored information, in accordance with the parity obtained through the decoding.

\* \* \* \* \*